Patented Oct. 30, 1923.

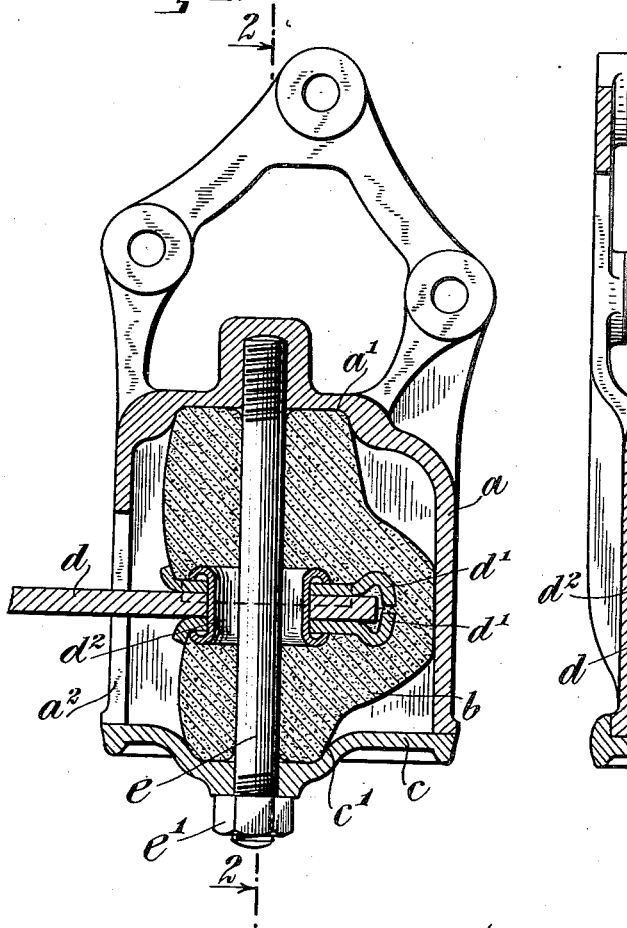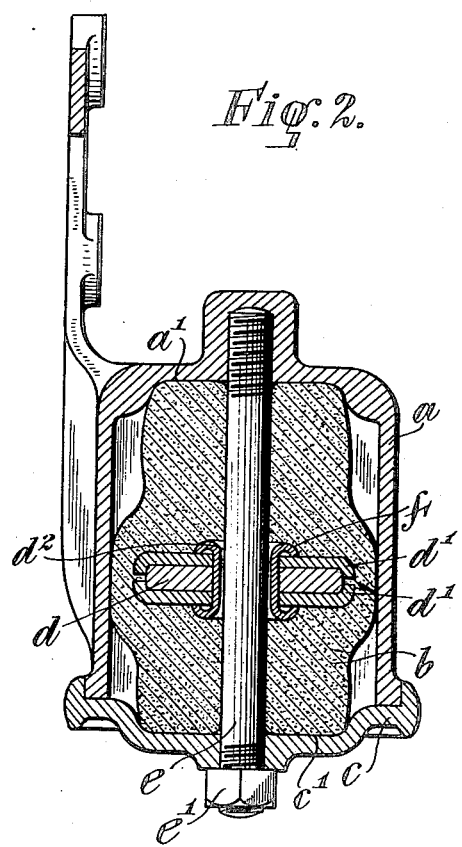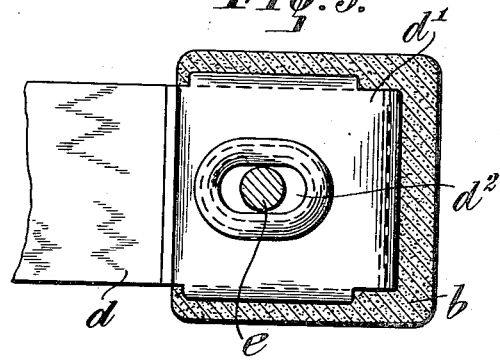

1,472,371

UNITED STATES PATENT OFFICE.

ALFRED F. MASURY, OF NEW YORK, AND AUGUST H. LEIPERT, OF COLLEGE POINT, NEW YORK, ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed March 17, 1922. Serial No. 544,430.

*To all whom it may concern:*

Be it known that we, ALFRED F. MASURY and AUGUST H. LEIPERT, citizens of the United States, and residing, respectively, in the borough of Manhattan and in the borough of Queens, of the city of New York, in the State of New York, have invented certain new and useful Improvements in Cushion Connection for Vehicle Construction, of which the following is a specification, reference being had to the accompanying drawings, forming a part hereof.

The present invention relates to a nonmetallic connection interposed between two metal parts of a motor vehicle, in which the stresses between the two parts are transmitted through such material. In accordance with the invention it is proposed to employ a block of rubber or the like, which shall be engaged with the two metal parts at remote points and constitute the sole connection therebetween. In the preferred construction the rubber or like material is confined under pressure. In association with the elements referred to there is provided a retaining unit by which the rubber or like material is confined this unit serving, incidentally, as a guide or stop for one of the metal parts whereby its movements are limited. In the particular application of the invention illustrated herein the connection is interposed between the end of the spring of a vehicle and the frame and a rubber block is confined in a housing carried by the frame while the end of the spring is seated in the block. A stud or bolt is employed for confining the block within the housing and this stud in the preferred form is extended up through the block and through a longitudinal slot formed in the spring. The relation of the slot to the stud is such as to permit longitudinal movement of the spring with respect thereto while preventing lateral displacement.

The preferred embodiment of the invention will be described with reference to the accompanying drawings in which:

Figure 1 is a view in vertical section through an improved connection applied to the end of a vehicle spring.

Figure 2 is a view in transverse section through the elements illustrated in Figure 1 and taken on the plane indicated by the line 2—2 of Figure 1 and looking in the direction of the arrows.

Figure 3 is a view in horizontal section through the block shown in Figure 1 the housing being omitted and the spring being shown in plan.

As indicated hereinbefore the preferred embodiment of the invention will be described with reference to its application to a connection between the end of a spring of a vehicle and its frame. The invention is not to be limited to the details of construction or the particular design of the elements employed in effecting the connection but for the purposes of this application there has been illustrated a housing $a$ adapted to be secured to the frame of a motor vehicle and confining a block $b$ of non-metallic resilient material such as rubber, a detachable cap $c$ serving to permit the introduction of the block and its retention under compression. The housing $a$ may be formed with the seat $a'$ for the block while the cap $c$ may likewise be formed with the seat $c'$ so that the block when confined will be held against displacement with respect to the housing. A flat leaf spring $d$ is indicated conventionally as entering the housing through an opening $a^2$ in one wall thereof and engaged with the block $b$. Suitable metal seats $d'$ for the block may be carried on the upper and lower faces of the spring, if desired. The spring is provided adjacent its end with a longitudinal slot $d^2$ preferably of restricted width but of sufficient length to permit, in the manner hereinafter indicated, longitudinal movement of the spring under flexure. The cap $c$ by which the block $b$ is held within the housing $a$ is secured detachably in place by means of a stud or bolt $e$ which, in accordance with the improvements, extends upwardly through the block $b$ and through the slot $d^2$ in the spring $d$. For convenience in manufacture and assembling the stud $e$ may be threaded into the housing $a$ and extend through the cap $c$ and present a threaded end on to which may be screwed a retaining nut $e'$. This is a matter of detail to which the present invention is not limited. The diameter of the stud $e$ is such with relation to the width of the slot $d^2$ as to permit free longitudinal movement of the spring while limiting excessive lateral movement thereof. As a further detail of construction it may be advantageous to press a sort of a bushing $f$ into the slot $d^2$ which bushing may conform generally to the outline thereof and be upset over the seats $d'$ so as to clamp them in place on the spring $d$. Where such a bushing is employed it will be understood that its width determines the effective width of the slot $d^2$ for cooperation of the stud $e$.

In operation, it is not to be expected that any stresses will actually be imposed on the stud $e$ by lateral displacement of the spring $d$ since normally, such stresses are resisted yieldingly by engagement of the block $d$ with the side walls of the housing $a$. Similarly, longitudinal movement of the spring $d$ will be made against the resistance offered by the yielding block $b$ since it seats at its end on the end wall of the housing $a$. However, it is apparent that a degree of stability and a positive stop is afforded by the stud $e$ and it is also evident that the block $b$ will be confined effectively within the housing $a$ by the central disposition of the stud.

Changes in matters of design and details of construction may be made without departing from the spirit of the invention which is defined in the appended claims.

What we claim is:

1. A connection and support interposed between two metallic parts of a motor vehicle one of which parts is to be connected to and supported by the other of said parts, including a block of non-metallic yielding material by which one of said metallic parts is confined, means carried with the other of said metallic parts to support the block and a stud carried by one of said metallic parts and passing loosely through the other of said metal parts and through the non-metallic material to secure it against movement with respect to both of said metallic parts while affording freedom for relative movement between the metallic parts.

2. In combination with the spring and frame of a motor vehicle a mechanical connection and support interposed between an end of the spring and the frame and including a block of non-metallic yielding material engaged with the end of the spring, a housing for the block secured to the frame and having a detachable cap by which the block is confined, said spring being slotted in the portion engaged with the yielding material and a retaining stud for the cap passing through the material and through said slot.

3. In combination with the spring and frame of a motor vehicle, a mechanical connection and support interposed between an end of the spring and the frame and including a block of non-metallic yielding material engaged with the end of the spring, a housing for the block secured to the frame, a cap for the housing to confine the block therein, said spring being slotted longitudinally in the portion engaged with the yielding material, and a retaining stud for the cap passing through the yielding material and through the slot and having a width a little less than the width of the slot but substantially less than the length of the slot.

4. In combination with the spring and frame of a motor vehicle a mechanical connection and support interposed between an end of the spring and the frame and including a block of non-metallic yielding material engaged with the end of the spring, metal seats on the faces of the spring for the material, said spring and seats being slotted longitudinally, a bushing pressed in the slot and upset over the seats to retain them in place, a housing for the block secured to the frame, a cap for the housing to confine the block, and a retaining stud for the cap passing through the block and the said bushing and of a width to limit lateral movement of the spring while permitting free longitudinal movement thereof.

This specification signed this 10 day of March, 1922.

ALFRED F. MASURY.
AUGUST H. LEIPERT.